United States Patent [19]

Slattery et al.

[11] Patent Number: 5,580,520

[45] Date of Patent: *Dec. 3, 1996

[54] LEAD-FREE ALLOY CONTAINING TIN, SILVER AND INDIUM

[75] Inventors: James A. Slattery, Sauquoit; Charles E. T. White, Clinton, both of N.Y.

[73] Assignee: The Indium Corporation of America, New York, N.Y.

[ * ] Notice: The term of this patent shall not extend beyond the expiration date of Pat. No. 5,256,370.

[21] Appl. No.: 334,699

[22] Filed: Nov. 4, 1994

Related U.S. Application Data

[63] Continuation of Ser. No. 141,139, Oct. 22, 1993, abandoned, which is a continuation of Ser. No. 878,050, May 4, 1992, Pat. No. 5,256,370.

[51] Int. Cl.$^6$ .................................................. C22C 13/00
[52] U.S. Cl. ..................... 420/557; 219/146.22
[58] Field of Search ..................... 420/557; 219/146.22

[56] References Cited

U.S. PATENT DOCUMENTS

| | | | |
|---|---|---|---|
| 1,565,115 | 12/1925 | Buckner et al. | 420/557 |
| 1,934,730 | 11/1933 | Murray et al. | 75/1 |
| 2,157,933 | 5/1939 | Hensel et al. | 200/166 |
| 2,306,667 | 12/1942 | Smith | 75/166 |
| 2,464,821 | 3/1949 | Ludwick et al. | 113/112 |
| 2,530,413 | 11/1950 | Warth | 220/64 |
| 2,532,265 | 11/1950 | Zickrick | 200/124 |
| 2,623,273 | 12/1952 | Murray et al. | 29/180 |
| 3,184,303 | 5/1965 | Grobin | 75/134 |
| 3,503,721 | 3/1970 | Lupfer | 29/195 |
| 3,627,517 | 12/1971 | Ibscher | 75/134 |
| 3,716,909 | 2/1973 | Stokes et al. | 29/504 |
| 3,833,362 | 9/1974 | Postupack | 75/134 |
| 4,268,585 | 5/1981 | Daur et al. | 428/622 |
| 4,373,974 | 2/1983 | Barajas | 148/24 |
| 4,670,217 | 6/1987 | Henson et al. | 420/562 |
| 4,695,428 | 9/1987 | Ballentine et al. | 420/561 |
| 4,778,733 | 10/1988 | Lubrano et al. | 428/647 |
| 4,797,328 | 1/1989 | Boehm et al. | 428/621 |
| 4,806,309 | 2/1989 | Tulman | 420/562 |
| 4,879,096 | 11/1989 | Naton | 420/561 |
| 4,919,729 | 4/1990 | Elmgren et al. | 148/24 |
| 5,052,489 | 10/1991 | Carisella et al. | 166/297 |
| 5,116,433 | 5/1992 | Davis et al. | 148/24 |
| 5,120,498 | 6/1992 | Cocks | 420/580 |
| 5,256,370 | 10/1993 | Slattery et al. | 420/557 |

FOREIGN PATENT DOCUMENTS

| | | |
|---|---|---|
| 1080838 | 4/1960 | Germany . |
| 58-29199 | 6/1983 | Japan . |
| 61-14096 | 1/1986 | Japan . |
| 2-217193 | 8/1990 | Japan . |
| 2-197396 | 8/1990 | Japan . |
| 4-2739 | 1/1992 | Japan . |

OTHER PUBLICATIONS

Rhines et al., Constitution of the System Indium–Tin, pp. 1–20, Paper Presented at the 28th Annual Convention of the American Society for Metals (1946).

Ludwick, Indium, pp. 21–151, The Indium Corporation of America (1959).

Manko, Solders and Soldering, pp. 115–123, McGraw Hill Book Company (2nd ed. 1979).

Federal Specification, Solder; Tin Alloy, Tin–Lead Alloy, and Alloy, QQ–S–571E (Interim Amendment 5 (ER) 28 Dec. 1989).

Stevens & White, Properties and Selection: Indium and Bismuth Metals Handbook, vol. 2 (10th ed. 1990).

Soldering of Electronic Products, Lead Industries Associatio (1991).

Anikeev et al., Improving the Brazeability of Steel with Siliconized Graphite by Alloying the Tin–Copper–Silver Brazing Alloy with Indium, 2390 Welding Production vol. 28 (1981) Mar., No. 3, Cambridge Great Britain, pp. 24–36.

Andreeva et al., Solder for Soldering Components of Electrovacuum Devices, Chemical Abstracts, vol. 91, No. 14, Abstract No. 111344 (May 30, 1979).

Assembly Joining Handbook: 4.2.1 Low Melting Temperature Solders, the Institute for Interconnecting and Packaging Electronic Circuits, pp. 1–4 (Dec., 1983).

Federal Specifications, Solder; Tin Alloy, Tin–Lead Alloy, And Lead Alloy, QQ–S–571E (Interim Amendment 5 (ER) 28 Dec. 1989).

Ludwick, Indium, The Indium Corporation of America, pp. 21–151 (1950).

Manko, Solders and Soldering: 3–25 Intermediate–Temperature Indium Base Solders, pp. 115–123, McGraw Hill Book Company (2nd ed. 1979).

Rhines et al., Constitution of the System Indium–Tin, Paper Presented at the 28th Annual Convention of the American Society for Metals, pp. 1–20 (1946).

Soldering of Electronic Products, Lead Industries Association Inc., pp. 2–17 (1991).

Stevens & White, Properties and Selection: Indium and Bismuth, Metals Handbook vol. 2, pp. 750–757 (10th ed. 1990).

The Indium Corporation Of America, Indalloy Specialty Solders and Alloys, pp. 1–17.

The Indium Corporation of America, Indalloy Fusible Alloys, pp. 1–5 (1988).

*Primary Examiner*—Deborah Yee
*Attorney, Agent, or Firm*—Fish & Neave; Douglas J. Gilbert; K. Iain McAusland

[57] ABSTRACT

A low melting point solder alloy comprising effective amounts of tin, silver and indium.

17 Claims, No Drawings

LEAD-FREE ALLOY CONTAINING TIN, SILVER AND INDIUM

This application is a continuation of application Ser. No. 08/141,139 filed Oct. 22, 1993, now abandoned which is a continuation of application Ser. No. 07/878,050, filed May 4, 1992, entitled Lead-Free Alloy Containing Tin, Silver and Indium, now U.S. Pat. No. 5,256,370.

BACKGROUND OF THE INVENTION

The present invention relates to lead-free alloys for use in soldering. More particularly, the present invention relates to a lead-free solder composition comprising tin, silver and indium.

Different solder compositions have unique characteristics which make them suitable for particular applications. Two characteristics of a solder which are important to its use are melting temperature and melting range.

The solder chosen for a particular use should have a low enough melting temperature that the melted solder does not damage any temperature-sensitive components that are to be joined. However, the melting temperature should also be high enough that the joint formed will not be affected by the operating temperature of the device or by subsequent soldering operations. In modern electronic applications, the temperature sensitivity of microelectronic components requires the use of solders at relatively low temperatures. In comparison, solders for joining and sealing pipes in plumbing operations are generally applied at much higher working temperatures because the components are not as temperature sensitive.

The melting range of a solder is also considered. Pure elemental metals have a melting point. Most alloys, however, with the exception of eutectic compositions, melt over a range of temperatures. The alloy begins to melt at a temperature called the solidus but is not completely liquid until it reaches a higher temperature called the liquidus. The range between the solidus and the liquidus is referred to as the pasty range. At temperatures within the pasty range, the alloy contains a mixture of solid and liquid phases containing different metal compositions. The solid phase contains higher melting point components and the liquid phase lower melting point components. Separation of the two components, called liquation, can alter the chemical composition of the alloy and the physical characteristics of the resulting joint.

Liquation can be particularly problematic in automated soldering operations in which components, such as circuit boards, are transported by conveyer belt through the soldering apparatus. After the solder has been applied by a process such as a wave soldering, the conveyor carries the components into a cooling zone. As the soldered joints cool, the solder solidifies. If a solder with a large pasty range is used, then parts of the soldered joint will begin to solidify while some of the solder remains liquid. Vibration from the conveyor belt will then tend to separate the two metal phases. The vibration and liquation may disrupt the crystallization of the solder. The disrupted joint may be physically weakened and conduct electricity poorly or not at all resulting in a circuit which is prone to failure or completely non-functional. In such applications, it is much preferable to use a eutectic solder or a solder with a very small pasty range.

Solders with small pasty ranges are also important in certain "step-soldering" operations where components are added to a device sequentially. These operations are also dependent upon solders with specific melting temperatures. In step soldering, the first components are joined using a relatively high melting temperature solder. When later components are joined, a lower melting temperature solder is used so that the earlier-soldered joints are not affected by the soldering operation. Further components may then be added using solder with an even lower melting temperature. The availability of solders with different melting points is critical to such step-soldering processes. It is also important, if several soldering steps are to be performed, for the melting ranges of the solders to be small.

Several solders are in common use in automated soldering operations. Sn63Pb37, comprising 63% tin and 37% lead, is a eutectic alloy which melts at 183° C. Sn62Pb36Ag02, comprising 62% tin, 2% silver and 36% lead, is a eutectic alloy which melts at 179° C. These solders have good characteristics for automated soldering. However, they suffer from the disadvantage that they contain lead.

Lead is known to have toxic effects. For this reason, rigorous limitations have been imposed upon the use of lead and lead-containing compositions. These limitations upon the use of lead-containing solders are most stringent in connection with plumbing where, until recently, the most popular plumbing solder was Sn50Pb50 which comprises 50% tin and 50% lead. Recent federal legislation banned the use of lead-containing solders in potable water systems forcing plumbers to stop using Sn50Pb50 and turn to lead-free solders.

Although plumbing is the most vivid example, other uses of lead-containing solders are also regulated. The United States Occupational Safety and Health Administration ("OSHA") has established a complex and extensive lead standard which regulates the permissible lead concentration in the air in the work place. In situations that result in high levels of lead in the air, OSHA regulations have strict requirements for minimizing employee exposure. Although most situations in which lead-containing solders are used do not produce lead concentrations high enough to trigger the OSHA standards, it is possible that stricter limitations upon the use of lead in solder might be imposed. Even in the absence of such regulations, reducing employee exposure to lead is still desirable.

It would therefore be desirable to reduce the dependence upon lead-containing solders for certain applications by providing lead-free alternative solders.

It would also be desirable to provide lead-free solder compositions with relatively low melting temperatures suitable for the assembly of electronic components.

It would further be desirable to provide lead-free solder compositions with relatively small pasty ranges suitable for use in automated soldering operations.

It would also be desirable to provide lead-free solder compositions which can replace currently used lead-containing solders such as Sn63Pb37.

SUMMARY OF THE INVENTION

It is an object of this invention to provide a solder composition for joining and sealing which is less toxic than common lead-containing solders.

It is a further object of this invention to provide lead-free solder compositions with relatively low melting temperatures suited to the assembly of electronic components. As used herein, "lead-free" means that the alloy or solder does not contain lead or is essentially free of lead. As a guideline to the meaning of "essentially free of lead," see Federal Specification QQ-S-571E Interim Amendment 5 (ER) 28 Dec. 1989, paragraph 3.2.1.1.1, as approved by the Commissioner, Federal Supply Service, General Services Administration (lead should not exceed 0.2%).

It is still further an object of this invention to provide lead-free solder compositions with relatively small pasty ranges suited for use in automated soldering operations.

It is also an object of this invention to provide a lead-free solder which can replace currently used lead-containing solders such as Sn63Pb37.

In accordance with the present invention, there are provided solders comprising tin, silver and indium. The above and other objects and advantages of the present invention will be apparent upon consideration of the following detailed description.

DETAILED DESCRIPTION OF THE INVENTION

The present invention relates to compositions comprising effective amounts of tin, silver, and indium. These compositions are suitable for electronic soldering operations. The preferred alloys are those with low melting temperatures and a relatively small pasty range.

In one embodiment of the invention, the composition comprises from about 70% to about 92% by weight tin, from about 1% to about 6% by weight silver and from about 4% to about 35% by weight indium. A preferred composition is about 77.2% by weight tin, about 2.8% by weight silver and about 20% by weight indium.

The alloy compositions of the present invention can be prepared by techniques well known in the art. For example, measured (by weight) amounts of tin, silver and indium can be placed in a heating vessel. These metals can then be melted together using any conventional melting technique. When the metals have been heated to a temperature at which all the material is liquid, the mixture can be allowed to cool and cast into a suitable mold. After cooling, the alloy can be fabricated into suitable shapes such as rods and the like.

The following examples present illustrative but non-limiting embodiments of the present invention. Unless otherwise indicated in the examples and elsewhere in the specification and claims, all parts and percentages are by weight.

EXAMPLE 1

An alloy is prepared having the following composition:

| | |
|---|---|
| Tin | 91.9% |
| Silver | 3.3% |
| Indium | 4.8% |

The resulting alloy has a solidus temperature of 212.1° C. and a liquidus temperature of 213.5° C. The alloy has a pasty range of 1.4° C.

EXAMPLE 2

An alloy is prepared having the following composition:

| | |
|---|---|
| Tin | 87.7% |
| Silver | 3.2% |
| Indium | 9.1% |

The resulting alloy has a solidus temperature of 02.4° C. and a liquidus temperature of 207.5° C. The alloy has a pasty range of 5.1° C.

EXAMPLE 3

An alloy is prepared having the following composition:

| | |
|---|---|
| Tin | 84.0% |
| Silver | 3.0% |
| Indium | 13.0% |

The resulting alloy has a solidus temperature of 94.1° C. and a liquidus temperature of 199.2° C. The alloy has a pasty range of 5.1° C.

EXAMPLE 4

An alloy is prepared having the following composition:

| | |
|---|---|
| Tin | 80.4% |
| Silver | 2.9% |
| Indium | 16.7% |

The resulting alloy has a solidus temperature of 88.9° C. and a liquidus temperature of 194.1° C. The alloy has a pasty range of 5.2° C.

EXAMPLE 5

An alloy is prepared having the following composition:

| | |
|---|---|
| Tin | 77.2% |
| Silver | 2.8% |
| Indium | 20.0% |

The resulting alloy has a solidus temperature of 178.5° C. and a liquidus temperature of 189.1° C. The alloy has a pasty range of 10.6° C.

EXAMPLE 6

An alloy is prepared having the following composition:

| | |
|---|---|
| Tin | 74.2% |
| Silver | 2.7% |
| Indium | 23.1% |

The resulting alloy has a solidus temperature of 171.6° C. and a liquidus temperature of 183.4° C. The alloy has a pasty range of 11.8° C.

EXAMPLE 7

An alloy is prepared having the following composition:

| | |
|---|---|
| Tin | 71.5% |
| Silver | 2.6% |
| Indium | 25.9% |

The resulting alloy has a solidus temperature of 167.8° C. and a liquidus temperature of 179.1° C. The alloy has a pasty range of 11.3° C.

Although these alloys have been described with regard to their utility for soldering of electronic components, they can be used in many of the applications for which solders are used. The low melting points of these solders make them particularly useful where temperature sensitive elements are to be joined or sealed.

While the invention has been explained in relation to its preferred embodiments, it is to be understood that various modifications thereof will become apparent to those skilled in the art. The foregoing disclosure is not intended or to be construed to limit the present invention, or to otherwise exclude any such other embodiments, adaptations, variations and equivalent arrangements, the present invention being limited only by the claims appended hereto and the equivalents thereof.

We claim:

1. A lead-free solder alloy wherein the constituent metals comprise from about 71.5% to about 91.9% by weight tin, from about 2.6% to about 3.3% by weight silver and from about 4.8% to about 25.9% by weight indium, said alloy having a solidus temperature between about 167° C. and about 212° C. and a liquidus temperature between about 179° C. and about 213° C.

2. The lead-free solder alloy of claim 1 wherein the constituent metals comprise at least about 9.1% by weight indium.

3. The lead-free solder alloy of claim 2 wherein the constituent metals comprise at least about 13% by weight indium.

4. The lead-free solder alloy of claim 3 wherein the constituent metals comprise at least about 16.7% by weight indium.

5. The lead-free solder alloy of claim 4 wherein the constituent metals comprise at most about 23.1% by weight indium.

6. A lead-free solder alloy in which the constituent metals comprise from about 84% to about 91.9% by weight tin, from about 1% to about 6% by weight silver and from about 4.8% to about 13% by weight indium.

7. The lead-free solder alloy of claim 6 wherein the constituent metals comprise at least about 9.1% by weight indium.

8. The lead-free solder alloy of claim 7 wherein the constituent metals comprise at most about 87.7% by weight tin.

9. The lead-free solder alloy of claim 8 wherein the constituent metals comprise at most about 3.3% by weight silver.

10. The lead-free solder alloy of claim 6 wherein the constituent metals comprise at most about 9.1% by weight indium.

11. The lead-free solder alloy of claim 10 wherein the constituent metals comprise at least about 87.7% by weight tin.

12. The lead-free solder alloy of claim 11 wherein the constituent metals comprise at most about 3.3% by weight silver.

13. A lead-free solder alloy wherein the constituent metals comprise from about 71.5% to about 80.4% by weight tin, from about 1% to about 6% by weight silver and from about 16.7% to about 25.9% by weight indium.

14. The lead-free solder alloy of claim 13 wherein the constituent metals comprise at most about 3.3% by weight silver.

15. The lead-free solder alloy of claim 13 wherein the constituent metals comprise at most about 23.1% by weight indium.

16. The lead-free solder alloy of claim 15 wherein the constituent metals comprise at least about 74.2% by weight tin.

17. The lead-free solder alloy of claim 16 wherein the constituent metals comprise at most about 3.3% by weight silver.

* * * * *